(12) United States Patent
Morishita (10) Patent No.: US 6,778,487 B2
(45) Date of Patent: Aug. 17, 2004

(54) TURNTABLE, METHOD OF MANUFACTURING THE SAME, AND DISC CHUCKING APPARATUS AND DISC DRIVE USING THE SAME

(75) Inventor: Tomoaki Morishita, Shizuoka (JP)

(73) Assignee: Sony Corporation (JP)

( * ) Notice: Subject to any disclaimer, the term of this patent is extended or adjusted under 35 U.S.C. 154(b) by 88 days.

(21) Appl. No.: 10/131,150

(22) Filed: Apr. 25, 2002

(65) Prior Publication Data

US 2002/0196728 A1 Dec. 26, 2002

(30) Foreign Application Priority Data

Apr. 27, 2001 (JP) ..................................... P2001-132885

(51) Int. Cl.[7] ........................... G11B 23/00; G11B 25/00
(52) U.S. Cl. ........................................ 369/264; 369/270
(58) Field of Search ................................. 369/264, 270, 369/271; 360/99.05, 99.12

(56) References Cited

U.S. PATENT DOCUMENTS

| | | | |
|---|---|---|---|
| 5,457,676 A | * 10/1995 | Park | 369/270 |
| 6,163,520 A | * 12/2000 | Kobayashi et al. | 369/271 |
| 6,222,818 B1 | * 4/2001 | Kobayashi et al. | 369/271 |
| 6,614,748 B2 | * 9/2003 | Shiomi et al. | 369/270 |
| 2003/0026193 A1 | * 2/2003 | Shiomi et al. | 369/270 |

\* cited by examiner

Primary Examiner—William Klimowicz
(74) Attorney, Agent, or Firm—Rader, Fishman & Grauer PLLC; Ronald P. Kananen (57) ABSTRACT

A plurality of positioning parts for positioning a disc chucking member that is inserted are formed in a circumferential surface of the disc engaging part of a turntable by providing stepped surfaces that are lower than a disc sliding surface of the circumferential surface of the disc engaging part. Molding pins are passed through these positioning parts, and the turntable is molded with the disk chucking member being positioned in this way. As a result, in a disc chucking apparatus and a disc-drive that use the turntable, a disc can be smoothly chucked without being impeded by the positioning parts of the disc chucking member that is inserted onto the disc engaging part, and recording and reproduction can be favorably performed.

11 Claims, 6 Drawing Sheets

TURNTABLE, METHOD OF MANUFACTURING THE SAME, AND DISC CHUCKING APPARATUS AND DISC DRIVE USING THE SAME

BACKGROUND OF THE INVENTION

1. Field of the Invention

The present invention relates to a turntable that is provided in a disc-drive for rotationally driving a disc-like recording medium, such as an optical disc or a magneto-optical disc, and recording and/or reproducing information, as well as to a method of manufacturing the turntable, a disc chucking apparatus that uses the turntable, and a disc-drive that uses the turntable.

2. Description of the Related Art

Information is usually recorded onto and reproduced from a disc-like recording medium like an optical disc (e.g., a CD (Compact Disc), CD-ROM (Compact Disc-Read Only Memory), or a DVD (Digital Video/Versatile Disc)), and a magneto-optical disc by loading a disc into a disc-drive. In a disc-drive, a disc-like recording medium in the form of an optical disc is placed upon a turntable that is attached to a rotational shaft of a spindle motor, the disc is chucked, and the disc is rotationally driven while an optical head of an optical pickup apparatus irradiates laser light at the information recording surface of the optical disc, with recording or reproduction being performed for the optical disc as the optical pickup apparatus is moved in the radial direction.

Figure 8:
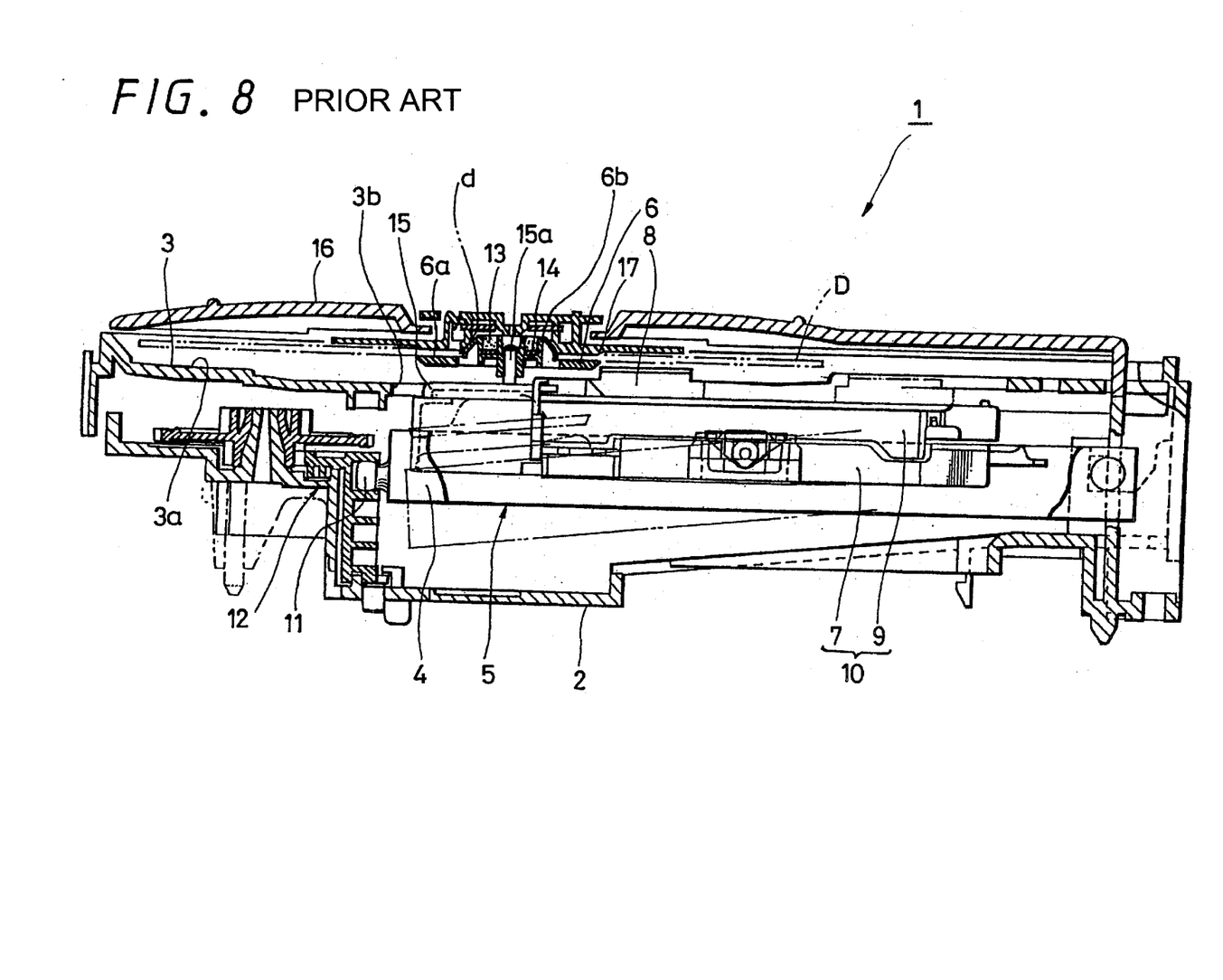
FIG. 8 is a vertical sectional view (from the side) of a disc-drive apparatus, part of which has been omitted.

FIG. 8 shows a conventionally known disc chucking apparatus and a disc-drive. The disc-drive 1 shown in FIG. 8 is composed of a box-like main chassis 2 that has openings in the top and the front surfaces, a disc tray 3 with a disc mounting part 3a that is moved in and out of the front opening of the main chassis 2 and on which an optical disc D is placed, a base holder 4 that is kept in a depressed part in the main chassis 2 and is supported so as to be able to swing, and a base unit 5 that is elastically supported by the base holder 4.

The base unit 5 includes a spindle chassis 7 that supports a turntable 6 to which the optical disc D is attached, so that the turntable 6 is freely rotatable and a pickup chassis 9 that supports an optical pickup apparatus 8, which reproduces information from the optical disc D that has been attached to the turntable 6, in a way such that the optical pickup apparatus 8 is able to move. The spindle chassis 7 and pickup chassis 9 compose a base chassis 10.

The pickup chassis 9 of the base unit 5 is supported in approximately the center of the spindle chassis 7, so as to be freely rotatable, while a rear end of the base holder 4 that supports the base unit 5 is rotatably supported by the main chassis 2. A cam pin 11 that is provided at the front end of the base holder 4 engages a chuck cam mechanism 12 disposed at the front of the main chassis 2, so that the base holder 4 is rotated up and down by the movement of the chuck cam mechanism 12 with the support at the rear end of the base holder 4 as the pivot.

A mounting part 6a on which the periphery of the center hole d of the optical disc D is placed and a disc engaging part 6b in the form of a truncated cone that engages the center hole d are integrally formed in the turntable 6 that is supported by the spindle chassis 7, with a ring-shaped magnet 13 being inserted along with a ring-shaped yoke plate 14 onto the disc engaging part 6b. A central shaft part of this turntable 6 engages and is fixed to rotational shaft 15a of a spindle motor 15 that is fixed to the spindle chassis 7.

A chuck holder 16 is attached to the top of the main chassis 2 so as to cross the disc tray 3 above the disc tray 3. A chucking plate 17 that faces the turntable 6 is supported by the chuck holder 16, so as to be capable of swinging and rotating.

When the disc-drive 1 of the above construction is not in use, the base unit 5 is moved downwards. In other words, the front of the base holder 4 is rotated downwards at an angle about the rear support, with the turntable 6 that is supported by the spindle chassis 7 being positioned below the disc tray 3.

In order to reproduce an optical disc D, the disc tray 3 is first ejected from the main chassis 2 by an eject operation. After an optical disc D has been placed on the disc mounting part 3a, a loading operation is performed and the disc tray 3 is retracted back into the main chassis 2, with the base holder 4 being rotated upwards into an approximately horizontal state via the cam pin 11 due to the chuck cam mechanism 12 being driven. Since the base holder 4 is moved upwards in this way, the turntable 6 enters the opening 3b in the disc tray 3 from below, with the disc engaging part 6b engaging the center hole d of the optical disc D that has been placed on the disc tray 3 and the periphery of the center hole d being mounted on the disc mounting part 6a of the turntable 6. The mounting part 6a of the turntable 6 lifts up the optical disc D slightly, with the chucking plate 17 that is supported by the chuck holder 16 being held by the magnet 13 that is inserted on the disc engaging part 6b of the turntable 6.

As a result, the optical disc D is chucked by being supported on both sides by the turntable 6 and the chucking plate 17 so that the optical disc D is coupled with the turntable 6 in the rotational direction and is rotated at a predetermined speed by the driving force of the spindle motor 15, with reproduction being performed by predetermined movement of the optical pickup apparatus 8.

Figure 11:
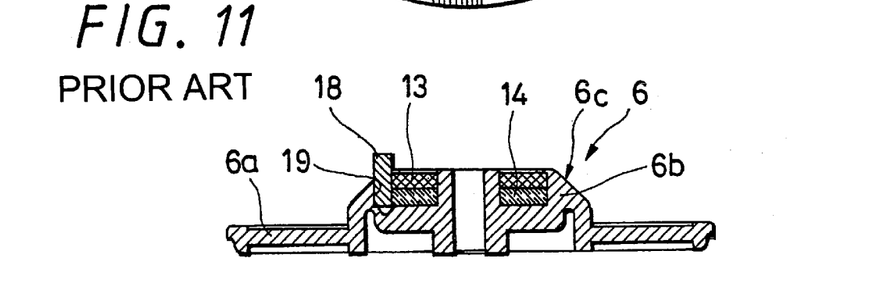
FIG. 11 is a sectional view of the molding state of the turntable shown in FIG. 9.

In a disc-drive 1 of the above construction, the turntable 6 of the rotational driving mechanism for the optical disc D is constructed of a ring-shaped magnet 13 and a ring-shaped yoke plate 14 that are inserted, as shown in FIG. 11, onto the disc engaging part 6b, which engages the center hole d of the optical disc D and is in the form of a truncated cone, so as to surround the center shaft portion of the disc engaging part 6b. With this construction, the optical disc D is chucked as shown in FIG. 8 between a chucking plate 17 and the magnet 13 and yoke plate 14.

The magnet 13 and the yoke plate 14 have to be inserted onto the disc engaging part 6b concentrically with the central shaft part of the turntable to prevent eccentric rotation of the turntable 6.

For the above reason, when the magnet 13 and the yoke plate 14 are inserted and the turntable 6 is molded, it is necessary to position the magnet 13 and the yoke plate 14 accurately. As shown in FIG. 11, this is conventionally achieved by arranging molding pins 18 for positioning the magnet 13 and the yoke plate 14 in the horizontal direction at at least three positions around the circumferential surface of the disc engaging part 6b during the molding of the turntable 6. The turntable 6 is then molded with the magnet 13 and the yoke plate 14 being positioned in the horizontal direction by these molding pins 18.

Figure 9:
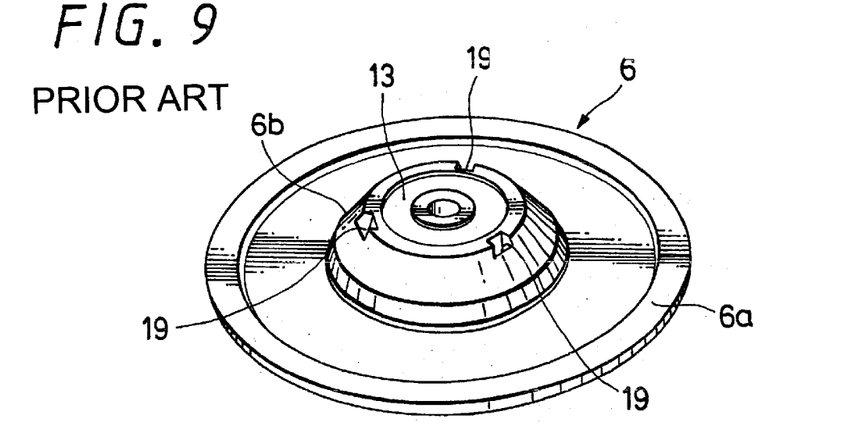
FIG. 9 is a perspective view of a conventional turntable.
Figure 10:
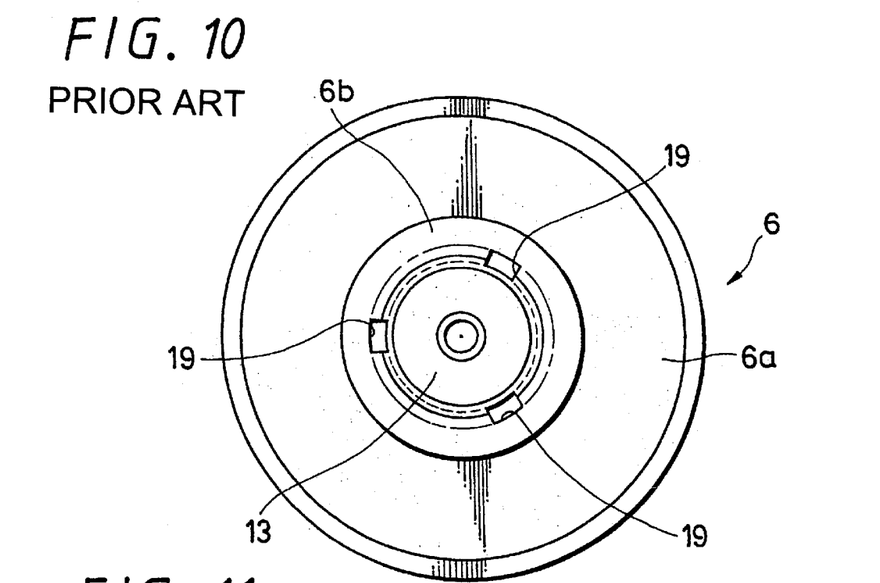
FIG. 10 is an overhead view of the turntable shown in FIG. 9.
Figure 12A:
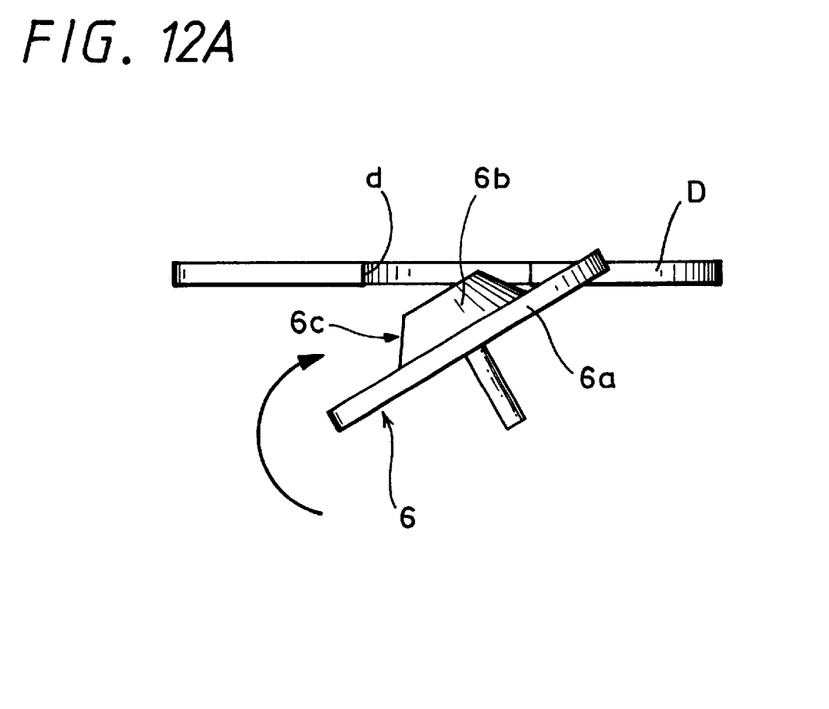
FIGS. 12A and 12B show the engaging/mounting operation of the turntable for a disc, with FIG. 12A showing the state at a midpoint during the engagement of the turntable with the disc and FIG. 12B showing the state where the engagement/mounting of the disc on the turntable is complete.
Figure 12B:
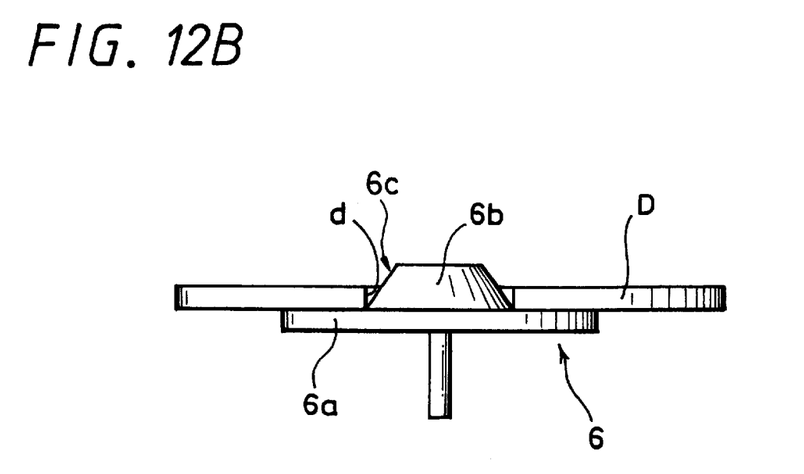

However, with a turntable 6 that has been molded as described above, the withdrawal holes 19 of the molding pins 18 are exposed to the circumferential surface of the disc engaging part 6b, as shown in FIGS. 9 and 10. When a disc chucking operation is performed with this turntable 6, as shown in FIGS. 12A and 12B, the turntable 6 rises from a position below and at an angle to the optical disc D, so that the disc engaging part 6b engages the center hole d of the optical disc D.

At this point, the sloped circumferential surface of the disc engaging part 6b, which composes the disc sliding surface 6c, comes into sliding contact with the inner circumferential edge of the center hole d, wherein the withdrawal holes 19 of the molding pins 18 ends up being on the disc sliding surface 6c for the inner circumferential edge of the center hole d of the optical disc D to get caught on the edges of the withdrawal holes 19 of the molding pins 18 that are positioned in the disc sliding surface 6c (i.e., the circumferential surface of the disc engaging part 6b), leading to potential problems during the chucking of the optical disc D. In particular, if burrs and rough edges remain at the peripheral edges of the withdrawal holes 19 of the molding pins 18 during molding, there is a further increase in the likelihood of such problems occurring.

SUMMARY OF THE INVENTION

The present invention was implemented in view of the problems described above and has an object of forming a turntable that is provided in a disc chucking apparatus or a disc-drive, the turntable being formed with a disc chucking member, which is one of a magnet and a magnetically attracted member, having been inserted onto a disc engaging part and with molding pins for positioning the disc chucking member being arranged so as not to touch the disc sliding surface.

In order to achieve the stated object, the present invention is a turntable that is formed with a disc chucking member, which is one of a magnet and a magnetically attracted member, having been inserted onto a disc engaging part that engages a center hole of a disc and is in the form of a protrusion, the turntable including a plurality of positioning parts for positioning the disc chucking member, the positioning parts being formed in a circumferential surface of the disc engaging part and being formed by providing stepped surfaces that are lower than a disc sliding surface of the circumferential surface of the disc engaging part.

With the turntable of the present invention that has the above construction, the positioning parts for the disc chucking member that is inserted onto the disc engaging unit that engages the center hole of a disc are formed by providing stepped surfaces that are lower than the disc sliding surface on the circumferential surface of the disc engaging part. As a result, the positioning parts do not protrude from the disc sliding surface, and when a disc engages and is mounted on the turntable, the inner circumferential edge of the center hole of the disc smoothly engages and is mounted on the disc sliding surface of the disc engaging part.

Also, the present invention is a method of manufacturing a turntable that is formed by inserting a disc chucking member, which is one of a magnet and a magnetically attracted member, onto a disc engaging part that engages a center hole of a disc and is in the form of a protrusion, including the steps of: arranging molding pins by (i) molding pins at stepped parts, which are lower than the molding surface for a disc sliding surface, at a plurality of positions on a mold corresponding to a circumferential surface of the disc engaging part and (ii) passing the molding pins through the stepped parts and molding the turntable with the disc chucking member having been positioned.

A turntable that is formed using the above method has positioning parts for the disc chucking member formed in stepped parts that are lower than the disc sliding surface of the circumferential surface of the disc engaging part, so that the positioning parts do not protrude from the disc sliding surface, and when a disc engages and is mounted on the turntable, the inner circumferential edge of the center hole of the disc smoothly engages and is mounted on the disc sliding surface of the disc engaging part.

A disc chucking apparatus according to the present invention is constructed so that a disc is chucked by being held between the above turntable and a chucking plate.

With a disc chucking apparatus of the above construction, the positioning parts for the disc chucking member are formed in stepped parts that are lower than the disc sliding surface of the circumferential surface of the disc engaging part, so that the positioning parts do not protrude from the disc sliding surface, and when a disc engages and is mounted on the turntable, the inner circumferential edge of the center hole of the disc smoothly engages and is mounted on the disc sliding surface of the disc engaging part.

The disc-drive of the present invention is constructed so as to perform recording and/or reproduction by rotationally driving a disc using a spindle motor that has the turntable described above.

With a disc-drive of the above construction, the positioning parts for the disc chucking member are formed in stepped parts that are lower than the disc sliding surface of the circumferential surface of the disc engaging part, so that the positioning parts do not protrude from the disc sliding surface, and when a disc engages and is mounted on the turntable, the inner circumferential edge of the center hole of the disc smoothly engages and is mounted on the disc sliding surface of the disc engaging part. As a result, favorable recording and/or reproduction can be performed.

DETAILED DESCRIPTION OF THE EMBODIMENTS

The following describes two embodiments of the present invention with reference to the attached drawings FIG. 1 to FIG. 7. As mentioned earlier, the turntables according to the embodiments are provided in disc chucking apparatuses and disc-drives.

Figure 1:
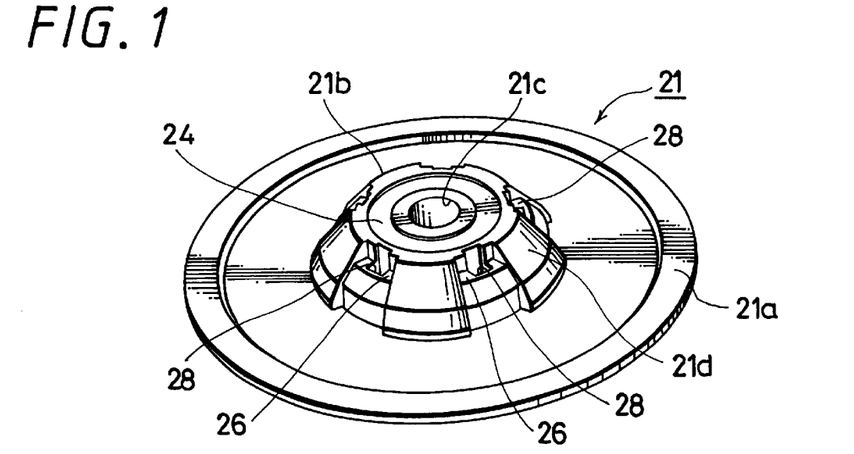
FIG. 1 is a perspective view of a turntable according to an embodiment of the present invention.
Figure 2:
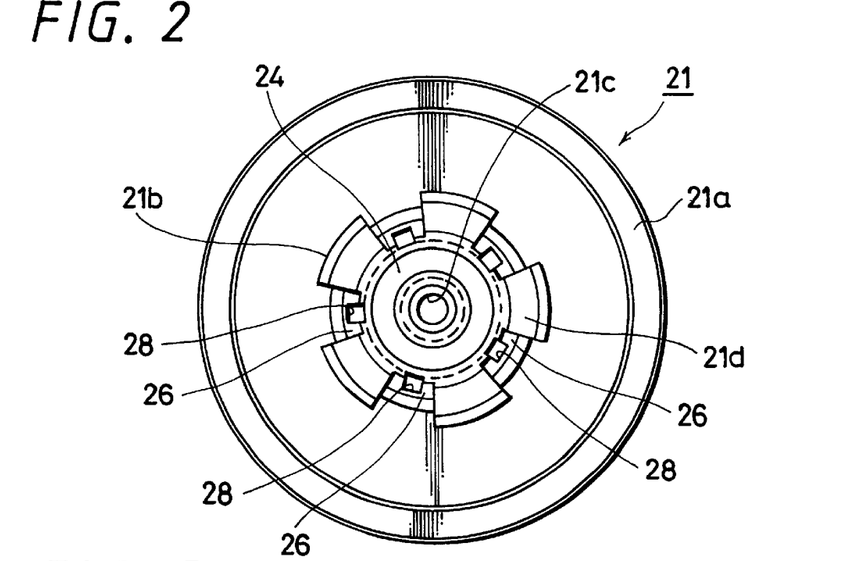
FIG. 2 is a plan view of the turntable shown in FIG. 1.

First, an embodiment of the present invention is described with reference to FIGS. 1 to 4. FIG. 1 is a perspective view of a turntable that is one embodiment of the present invention, FIG. 2 is an overhead view of the turntable, FIG. 3; is a perspective view of the molding state of the turntable; and, FIG. 4 is a perspective view showing the relationship between the turntable and a chucking plate.

Like the turntable described earlier, the turntable 21 shown in FIGS. 1 to 4 is integrally formed with a disc mounting part 21a on which the periphery of the center hole of a disc is placed and a disc engaging part 21b that engages the center hole of the disc and is in the shape of a truncated cone. A ring-shaped magnet 24 and a ring-shaped back yoke plate 25, which comprise the disk chucking member 23, are inserted onto the disc engaging part 21b, so as to surround a central shaft hole 21c. With the turntable 21 of the present embodiment, positioning parts 26 (hereafter referred to as the magnet positioning parts) for the disk chucking member 23 are formed at at least three positions on a disc sliding surface 21d that is the side surface of the disc engaging part 21b as parts that are lower than the disc sliding surface 21d.

Figure 3:
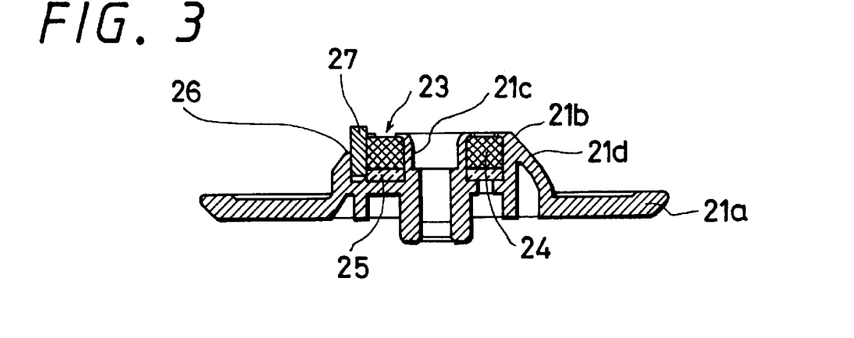
FIG. 3 is a sectional view of the molding state of the turntable shown in FIG. 1.
Figure 4:
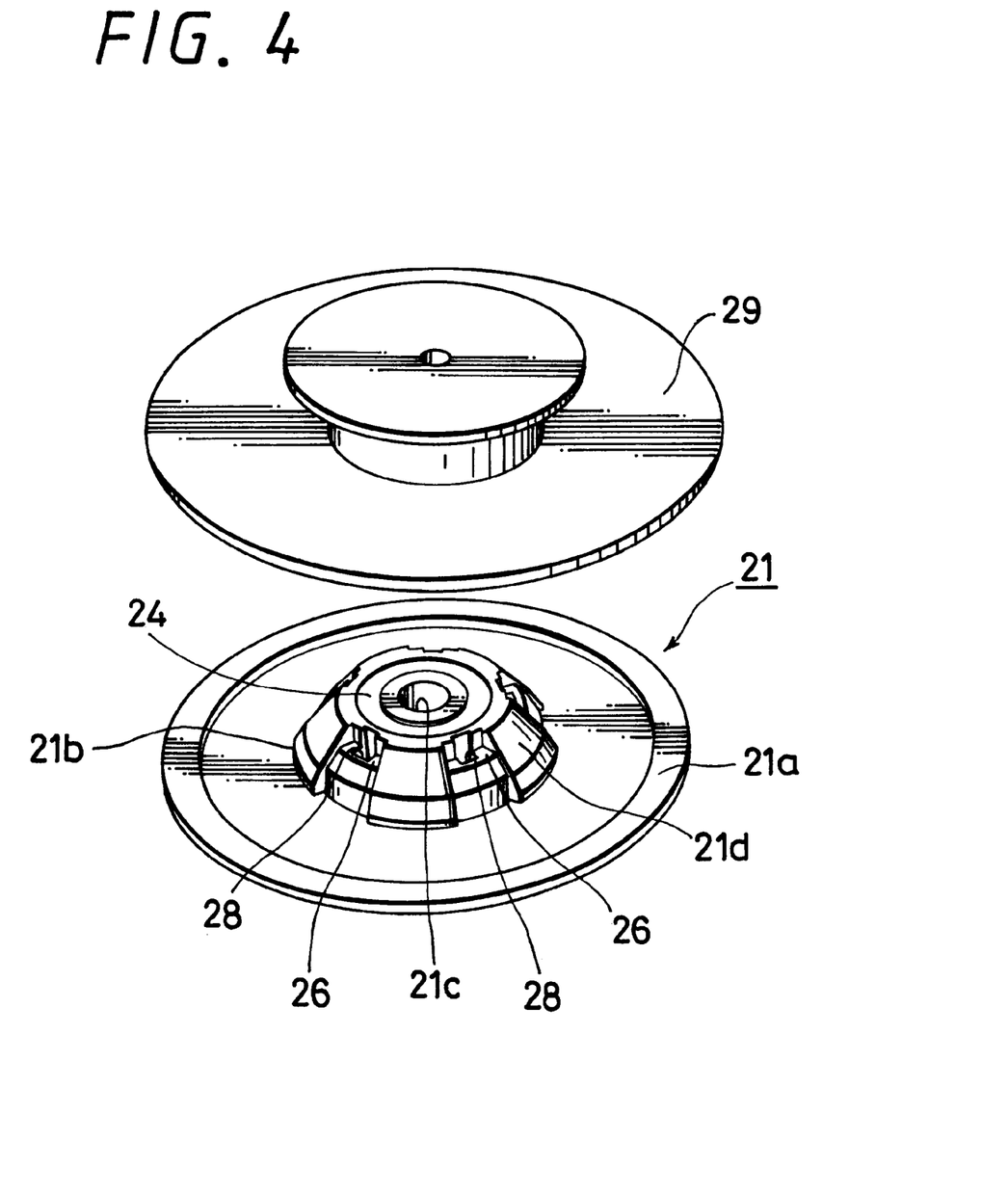
FIG. 4 is a perspective view showing the relationship between the turntable shown in FIG. 1 and the chucking plate.

As shown in FIG. 3, the turntable 21 of the present embodiment is molded with molding pins 27 for positioning the disk chucking member 23 being disposed so as to correspond to the magnet positioning parts 26 of the disc engaging part 21b. Molding is performed with the magnet 24 and the back yoke plate 25, which comprise the disc chucking member 23, being positioned in the horizontal direction by the molding pins 27, so that the magnet 24 and the back yoke plate 25 are concentric with the central shaft hole 21c.

In a turntable 21 that is molded in this way, withdrawal holes 28 of the molding pins 27 are formed in the circumferential surface of the disc engaging part 21b, although such withdrawal holes 28 are positioned inside the magnet positioning parts 26 that are lower than the disc sliding surface 21d (i.e., the circumferential surface of the disc engaging part 21b), and so they do not affect the disc sliding surface 21d. As one example, even if burrs and rough edges are produced at the peripheries of the withdrawal holes 28 during molding, such burrs and rough edges do not protrude from the disc sliding surface 21d.

Accordingly, when the turntable 21 engages a disc, the periphery of the center hole of the disc is smoothly mounted on and engages the disc engaging part 21b without becoming caught on the disc sliding surface 21d of the disc engaging part 21b.

In a turntable 21 of the present embodiment with the above construction, only a magnet 24 may be used as the disc chucking member 23 that is provided in the disc engaging part 21b. In this case, the length of the molding pins 27 can be reduced by an amount corresponding to the back yoke plate 25.

Also, when a magnet is provided on the chucking plate 29 side that faces the turntable 21, as shown in FIG. 4, a magnetically attracted plate composed of a steel plate or the like is used as the disc chucking member 23 on the turntable 21 side.

The turntable 21 is molded from a resinous material, such as ABS (Acrylonitrile Butadiene-Styrene) resin, although the turntable 21 may be formed from a non-ferrous metal material, such as an aluminum alloy.

Figure 5:
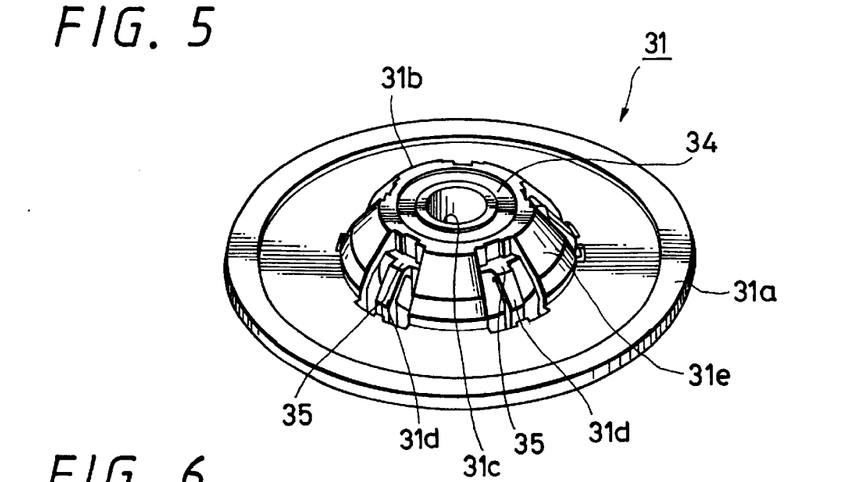
FIG. 5 is a perspective view of a turntable according to another embodiment of the present invention.
Figure 6:
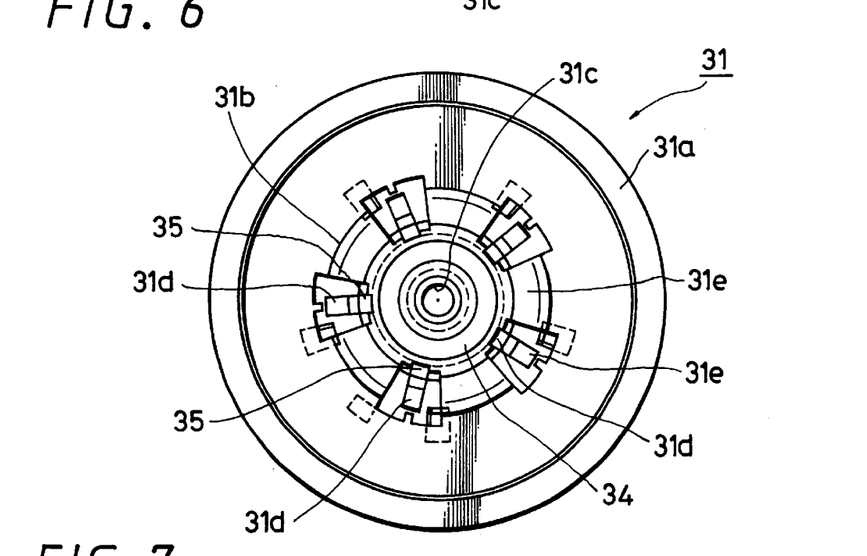
FIG. 6 is a plan view of the turntable shown in FIG. 5.
Figure 7:
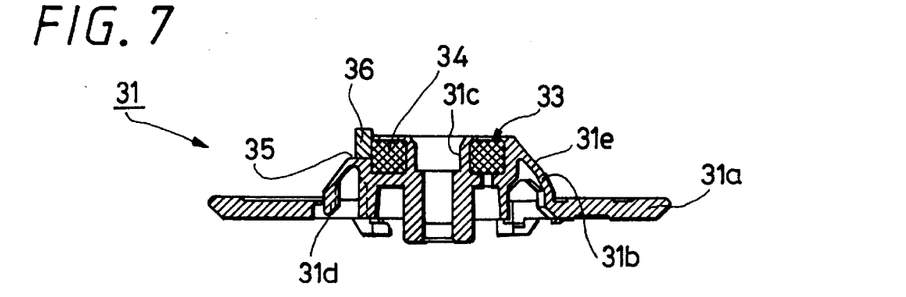
FIG. 7 is a sectional view of the molding state of the turntable shown in FIG. 5.

The following describes an alternate embodiment of the present invention with reference to FIGS. 5 to 7. FIG. 5 is a perspective view of the turntable of this alternate embodiment; FIG. 6 is an overhead view of the turntable; and FIG. 7 is a perspective view of the molding state of the turntable.

The turntable 31 of this alternate embodiment shown in FIGS. 5 to 7 is a movable turntable that includes an alignment mechanism that is provided in a disc-drive apparatus, such as a DVD drive. Like the turntable 21 of the embodiment described earlier, the turntable 31 is integrally formed with a disc mounting part 31a, on which the periphery of the center hole of a disc is placed, and a disc engaging part 31b, which engages the center hole of the disc and is in the shape of a truncated cone. A ring-shaped magnet 34, which is the disk chucking member 33, is inserted onto the disc engaging part 31b so as to surround a central shaft hole 31c.

A plurality of elastic ribs 31d are formed on the circumferential surface of the disc engaging part 31b as the center alignment mechanism of the turntable 31, with the diameter of a circle on which the tips of the free ends of all of the elastic ribs 31d lie being set slightly larger than the diameter of the center hole of a disc. The free ends of these elastic ribs 31d press against the inner circumferential surface of the center hole of the disc at a plurality of positions so as to center and position the disc on the turntable 31. At the same time, fixed surface parts of the circumferential surface of the disc engaging part 31b that are located between the elastic ribs 31d form the disc sliding surface 31e.

Also, in this turntable 31 of the alternate embodiment, disc chucking member positioning parts (hereafter referred to as the "magnet positioning parts") 35 are formed at the fixed ends of the elastic ribs 31d that compose the alignment mechanism of the disc engaging part 31b. These magnet positioning parts 35 are in the form of stepped surfaces that are lower than the disc sliding surface 31e.

As shown in FIG. 7, in the molding state of this turntable 31 of the alternate embodiment, molding pins 36 for positioning the disc chucking member are disposed so as to correspond to the magnet positioning parts 35 of the disc engaging part 31b. Molding is performed with the magnet 34, which is the disc chucking member 33, being positioned in the horizontal direction by the molding pins 36 so that the magnet is concentric with the central shaft hole 31c.

In a turntable 31 that is molded in this way, the magnet positioning parts 35 are exposed to the circumferential surface of the disc engaging part 31b, although since the magnet positioning parts 35 are formed as stepped surfaces that are lower than the disc sliding surface 31e (i.e., the circumferential surface of the disc engaging part 31b), the magnet positioning parts 35 do not affect the disc sliding surface 31e.

When the turntable 31 engages a disc, the periphery of the center hole of the disc is smoothly mounted on and engages the disc engaging part 31b without becoming caught on the disc sliding surface 31e of the disc engaging part 31b, with the plurality of elastic ribs 31d aligning the disc to ensure that the disc is correctly mounted on the turntable 31 and is reliably chucked by the chucking plate.

By being constructed as described above, the turntable 31 of this alternate embodiment differs from the turntable 21 of the first embodiment in that a back yoke plate for the magnet 34 is not internally provided. When a back yoke plate is provided, however, molding is performed with molding pins 36 whose lengths correspond to the thickness of the magnet 34, and the back yoke plate and withdrawal holes for the molding pins 36 are formed in the stepped surfaces forming the magnet positioning parts 35.

It is preferable for the turntable 31 to be molded from a resinous material that exhibits elasticity.

The turntable 21 of the first embodiment and the turntable 31 of the alternate embodiment with the constructions described above are provided in a disc chucking apparatus and a disc-drive like those shown in FIG. 8. The disc-drive shown in FIG. 8 is constructed so that a disc is engaged by and mounted on the turntable at an angle to the disc from below and also is chucked. However, it also is possible to use the turntable in a disc-drive where the disc is chucked by the turntable after approaching parallelly to and engaging the disc or in a disc-drive where the disc is chucked after it moves towards and engages the turntable.

While the present invention has been described by way of the above embodiments, the present invention is not limited to these embodiments, so that various modifications can be made without departing from the scope of the present invention.

As examples, the external appearance of the turntable can be changed as desired, and there are no particular restrictions regarding the driving mechanism of the turntable.

The turntable of the present invention also can be adapted for use in various kinds of disc chucking apparatuses and disc-drives.

What is claimed is:

1. A turntable that is formed with a disc chucking member, which is one of a magnet and a magnetically attracted member, having been inserted onto a disc engaging part that engages a center hole of a disc and is in the form of a protrusion, comprising a plurality of positioning portions for positioning the disc chucking member, the positioning portions being formed in a circumferential surface of the disc engaging part and being formed by providing stepped surfaces that are lower than a disc sliding surface of the circumferential surface of the disc engaging part.

2. A turntable according to claim 1, wherein the positioning portions are holes for arranging molding pins.

3. A turntable according to claim 1, wherein the positioning portions are the stepped surfaces for arranging molding pins.

4. A disc chucking apparatus for chucking a disc, wherein a turntable is formed with a disc chucking member, which is one of a magnet and a magnetically attracted member, that is inserted onto a disc engaging part that engages a center hole of a disc and is in the form of a protrusion and a plurality of positioning portions for positioning the disc chucking member, the positioning portions being formed in a circumferential surface of the disc engaging part by providing stepped surfaces that are lower than a disc sliding surface of the circumferential surface of the disc engaging part.

5. A disc chucking apparatus according to claim 4, wherein the positioning portions of the turntable are holes for arranging molding pins.

6. A disc chucking apparatus according to claim 4, wherein the positioning portions of the turntable are the stepped surfaces for arranging molding pins.

7. A disc-drive for recording and/or reproducing a disc comprising a spindle motor for rotationally driving a disc, the spindle motor having a turntable that is formed with a disc chucking member, which is one of a magnet and a magnetically attracted member, having been inserted onto a disc engaging part that engages a center hole of the disc and is in the form of a protrusion, and a plurality of positioning portions for positioning the disc chucking member, the positioning portions being formed in a circumferential surface of the disc engaging part by providing stepped surfaces that are lower than a disc sliding surface of the circumferential surface of the disc engaging part.

8. A disc-drive according to claim 7, wherein the positioning portions of the turntable are holes for arranging molding pins.

9. A disc-drive according to claim 7, wherein the positioning portions of the turntable are the stepped surfaces for arranging molding pins.

10. A disc-drive according to claim 7, further comprising a disc chucking apparatus for chucking the disc by holding the disc between the turntable and a chucking plate.

11. A disc-drive according to claim 10, wherein the disc is one of an optical disc and a magneto-optical disc.

* * * * *